UNITED STATES PATENT OFFICE.

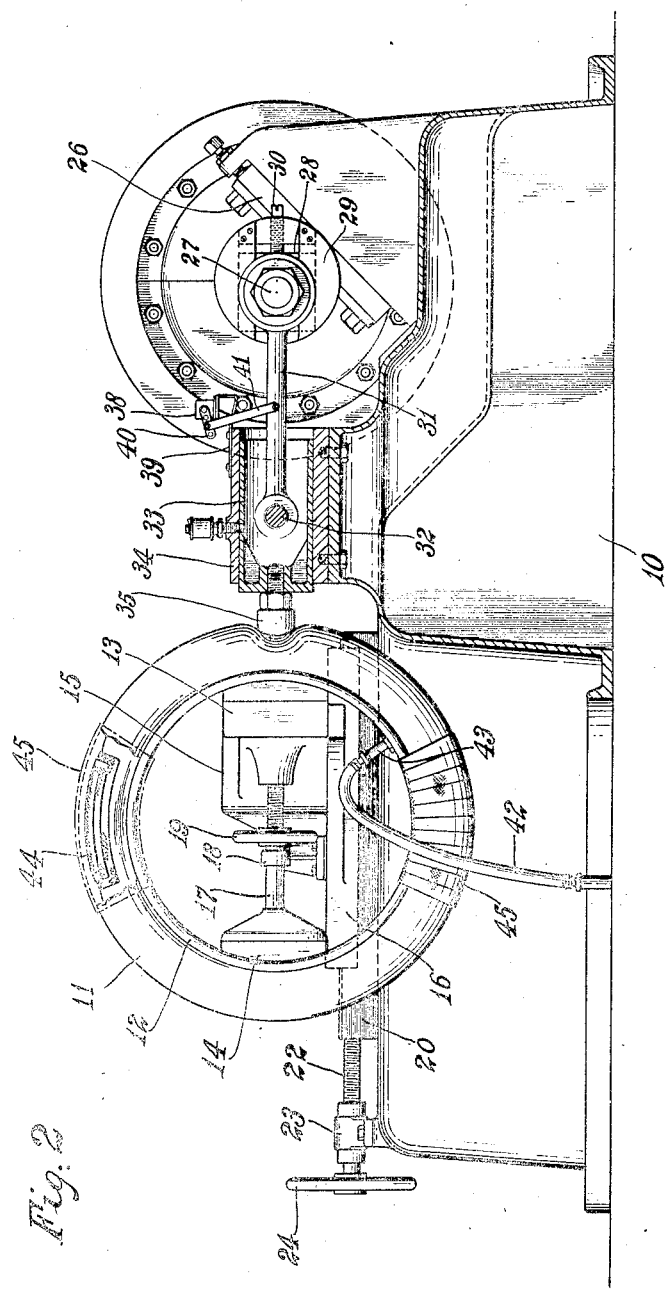

HIRAM D. AYRES, OF AKRON, OHIO, ASSIGNOR TO THE B. F. GOODRICH COMPANY, OF NEW YORK, N. Y., A CORPORATION OF NEW YORK.

TIRE-TESTING METHOD AND MACHINE.

1,408,159.  Specification of Letters Patent. Patented Feb. 28, 1922.

Application filed April 10, 1920. Serial No. 372,796.

*To all whom it may concern:*

Be it known that I, HIRAM D. AYRES, a citizen of the United States, residing at Akron, in the county of Summit and State of Ohio, have invented a certain new and useful Tire-Testing Method and Machine, of which the following is a specification.

This invention relates to the testing of rubber tires such, for example, as pneumatic tires, and its object is to provide a method and an apparatus for determining the strength and durability of the tires without the expense and inconvenience of a prolonged rolling test on the road or in a laboratory. The invention is adapted to afford a comparison of the qualities of different tires, or of different parts of the same tire. The central idea of my method consists in repeatedly flexing, distorting or indenting the tire in the same spot or locality, either for an indeterminate number of times until it gives way or undergoes externally observable deterioration, such as bursting in the case of a pneumatic tire, and counting the number of flexures up to the time of failure, or for a predetermined number of times sufficient to permit a useful comparison of resulting deteriorative changes.

Of the accompanying drawings:

Fig. 2 is a side elevation of said machine, partly broken away, and in section on the line 2—2 of Fig. 1.

Figure 1:
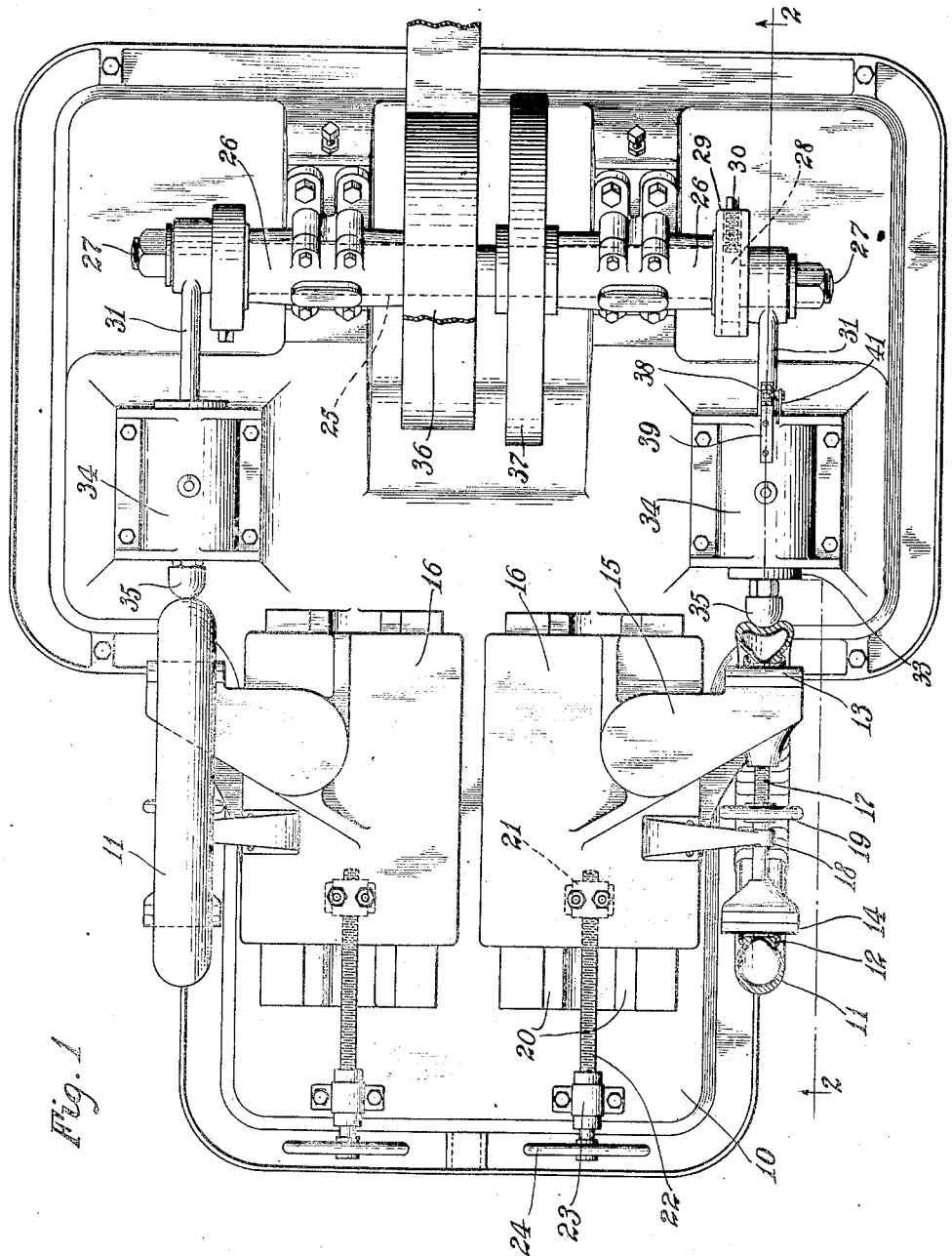
Fig. 1 is a top plan view, partly broken away, showing a duplex machine embodying and adapted to perform my invention, with two tires in position thereon for testing.

In the drawings, 10 is a base casting supporting the operative parts of the machine. The illustration shows automobile-type pneumatic tires, 11, 11, each comprising a casing and an inner tube detachably mounted on a rim 12 which is supported by its inner periphery on a clamping holder. Said holder comprises a pair of segmental jaws, 13, 14, of which the jaw 13 is formed on a massive arm 15 projecting from a slide 16, while the jaw 14 is provided with a stem 17, which is supported in a bearing 18 on the slide 16 and provided with a hand-wheel 19 for turning it, the left-hand end of said stem being rotatably stepped in a socket in the back of the jaw 14, while its right-hand end is formed with a thread which screws into a threaded socket on the back of the jaw 13. By turning the hand-wheel 19, the movable jaw 14 may be projected against the rim 12 or retracted therefrom to clamp and release said rim. The slide 16 is mounted to travel on guides 20 on the base 10, and is provided on its under side with a nut 21 engaging a screw 22 which is held against axial movement in a bearing 23 on the base and provided on its outer end with a hand-wheel 24, whereby the tire holder may be adjusted in a direction parallel with the plane of the tire, to accommodate tires of different sizes and to bring into operative relation with the flexing member a point on the periphery of the tire which is backed by the jaw 13, whose fixed, massive mounting enables the thrust of the ram to be properly resisted.

25 is a shaft mounted transversely of the base in suitable bearings 26 and carrying at its ends two crank-pins 27, 27, which are preferably placed at different angles, such as 180° apart, to balance the reciprocating motion of the two plungers. Each crank-pin is carried by a block 28 mounted to slide radially in suitable guides on a crank-plate 29 and adjustable by means of a screw 30 so that the stroke of the crank-pin may be varied. The crank-pin 27 is connected by a pitman 31 with a wrist-pin 32 on a cylindrical ram or plunger 33, the latter being mounted to reciprocate in a fixed guide 34 and having on its end, adjacent the tire, a flexing nub or member 35, The operative face of this nub may have different shapes and sizes suited to the character of tire under test, and for a pneumatic tire it is preferably hemispherical in form. The line of action against the tire is preferably radial, as here shown, although I do not wholly limit myself in this respect.

The shaft 25 carries between the bearings 26 a belt pulley 36 and a fly-wheel 37. Motion is taken from one of the pitmen 31 to actuate a revolution counter 38, which is here shown as mounted on a bracket 39 on the plunger guide 34 and provided with a pawl arm 40 oscillated from the pitman by a link 41. 42 is a compressed-air supply pipe, by which the tires may be inflated through the usual tire valve 43.

In the operation of the machine, the shaft 25 being in rotation at a suitable rate, which is preferably about three hundred to three hundred and twenty-five turns per minute, reciprocates the rams or plungers 33 at an equal rate with strokes of relatively-small amplitude. A rim 12 carrying a tire 11 inflated to a pressure preferably considerably higher than its rated service pressure, say one hundred and twenty-five pounds per square inch for a tire rated to run on the road at seventy pounds, is clamped in position by the holder jaws 13, 14, and the slide 16 and crank pin 27 are adjusted so that, at the spot where the nub 35 impinges on the tire, the tire will have its normal section when the ram is in its most-retracted position and will, when said ram is in its most-projected position, be flexed or indented to a depth of about one-third to one-half of its radial depth as indicated in Fig. 2 and at the lower side of the view in Fig. 1. The reading of the counter 38 is taken at the beginning of the operation for each tire as the latter is mounted in the machine, and the tire is subjected to repeated flexures on the same spot until it fails, which is generally evidenced by the tire bursting through both air-tube and casing, but may be shown by deflation caused by pinching of the air-tube by a break on the inner side of the casing. This may occur at anywhere from a few thousand to several hundred thousand flexures, depending upon the depth of flexure, the inflation pressure and the quality of the tire at the point under treatment. In this way, a comparison of the strength and durability of different tires under similar conditions may be obtained much more quickly and at less expense than by means of a road test, and also under somewhat different conditions as compared with the ordinary rolling test as conducted in the laboratory. The present form of test affords a determination as to uniformity of strength in different parts of the tire and enables the tire maker to introduce corrections in his methods of manufacture when it is found that one part tests much differently from another. When the tire 11 has burst at one place, it may be demounted and provided with a blow-out patch 44 at the point of failure and with a new tube or repaired tube and an external wrapping 45 over the broken place, and may then be remounted and tested at another spot.

This machine may also be used to test solid rubber tires in a similar manner, either by ramming the tire in one spot, as described, until the deterioration is visible externally, or by ramming it for a predetermined number of times which experience has shown should be sufficient to produce internal deterioration, then removing the tire, cutting it open to observe its condition and comparing its condition with that of other tires similarly tested.

I claim:

1. The method of testing pneumatic tires which comprises subjecting the inflated tire, radially of its tread portion and at a single locality thereon, to rapidly-repeated flexures, until it fails, and counting the number of said flexures.

2. The method of testing pneumatic tires which comprises holding the inflated tire against rotation, subjecting the tire, while so held, to rapidly-repeated radial flexures at a single spot on the tread thereof, until it bursts, and counting said flexures.

3. The method of testing pneumatic tires which comprises rapidly and consecutively flexing the inflated tire at a single spot thereon until its bursts, counting the flexures, patching the tire at that spot, and repeating said flexing and counting, until the tire bursts, at one or more other spots around the tire.

4. The method of testing pneumatic tires which comprises inflating the tire with air at a pressure above its service pressure, repeatedly pressing the tread wall thereof radially inward at a single spot, to a depth approximating a third to a half of the tire depth, until the tire bursts, and counting the flexures.

5. In a tire-flexing machine, the combination of a reciprocatory tire-tread ram, driving mechanism therefor, a pneumatic-tire rim, and means for non-rotatively holding said rim in position to present a tire thereon with its tread in radial flexing relation to said ram.

6. In a tire-flexing machine, the combination of a slidingly-mounted tire-tread ram, a crank and pitman for rapidly reciprocating said ram, means for automatically counting the strokes of the ram, and an outwardly-acting holder for gripping a tire rim by its inner periphery and non-rotatively holding the tread of a tire thereon in flexing relation to said ram.

7. In a tire-flexing machine, the combination of a reciprocatory tire-tread ram, a holder for non-rotatively presenting a tire with its tread in flexing relation to said ram, means for adjusting said holder in the line of movement of said ram, and means for automatically counting the strokes of the ram.

8. In a tire-flexing machine, the combination of a tire-rim holder comprising a pair of outwardly-acting jaws adapted to grip the inner periphery of the rim, one of said jaws being fixedly mounted on a support, the other being movable toward and from said fixedly-mounted jaw, a reciprocatory ram adapted to flex the tread of the tire at a point backed by said fixedly-mounted jaw, and means for automatically counting the reciprocations of said ram.

9. In a tire-flexing machine, the combination of a tire rim holder, a slidingly-mounted ram adapted to engage the tread of a tire supported on said holder, a pitman connected with said ram, a crank-shaft, a crank-pin radially adjustable on said crank-shaft and connected with the pitman, and means for automatically counting the strokes of said ram.

10. In a tire-flexing machine, the combination of a reciprocatory ram, means for varying the length of strokes of said ram, means for counting its strokes, a tire-holder adapted to support a tire with its tread presented in position for flexure by the ram, and means for adjusting said holder toward and from the ram.

11. In a tire-flexing machine, the combination of a pair of reciprocatory tire-tread rams, means for holding tires in position to be flexed by said rams, and actuating means for said rams so connected that the rebound force of each ram is applied to the other ram to advance the latter.

In testimony whereof I have hereunto set my hand this 5th day of April, 1920.

HIRAM D. AYRES.